United States Patent
Humphrey et al.

(10) Patent No.: US 11,876,603 B2
(45) Date of Patent: Jan. 16, 2024

(54) BEAM SWITCHING USER DATA OUTAGE REDUCTION IN A SPOT BEAM SATELLITE SYSTEM

(71) Applicant: Hughes Network Systems, LLC, Germantown, MD (US)

(72) Inventors: Eric Humphrey, Germantown, MD (US); Suresh Korada, Germantown, MD (US); Guy Montgomery, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/165,737

(22) Filed: Feb. 7, 2023

(65) Prior Publication Data
US 2023/0188205 A1    Jun. 15, 2023

Related U.S. Application Data

(63) Continuation of application No. 17/133,761, filed on Dec. 24, 2020, now Pat. No. 11,606,137.

(51) Int. Cl.
*H04B 7/185*  (2006.01)
*H04W 76/30*  (2018.01)
(Continued)

(52) U.S. Cl.
CPC ........ *H04B 7/18541* (2013.01); *H04J 3/1694* (2013.01); *H04W 28/10* (2013.01);
(Continued)

(58) Field of Classification Search
CPC ................ H04B 7/18541; H04B 7/212; H04B 7/18519; H04J 3/1694; H04W 28/10; H04W 76/10; H04W 76/30; H04W 88/16
See application file for complete search history.

(56) References Cited

U.S. PATENT DOCUMENTS 5,987,326 A * 11/1999 Tiedemann, Jr. ..... H04W 52/40
455/442
11,606,137 B2   3/2023  Humphrey et al.
(Continued)

FOREIGN PATENT DOCUMENTS

WO   2020221092 A1   11/2020
WO   2022140087 A1   6/2022

OTHER PUBLICATIONS

International Search Report for PCT Application PCT/US2021/062977.

*Primary Examiner* — Fred A Casca
(74) *Attorney, Agent, or Firm* — Capitol City TechLaw; Jasbir Singh

(57) ABSTRACT

A system and method for beam switching by a User Terminal (UT). The method includes initiating a beam switch between an old beam and a new beam when the UT is disposed in an overlap area of the old beam and the new beam; duplicating over the new beam, at a Network Access Point (NAP), user traffic to the UT; and assigning a Time Division Multiplex Access (TDMA) allocation for the UT on the new beam, prior to an arrival of the UT on the new beam, where the user traffic traversing a satellite network remains uninterrupted during the beam switch and the NAP redirects user traffic for the UT via the old beam to the new beam.

20 Claims, 3 Drawing Sheets

(51) Int. Cl.
  *H04W 76/10* (2018.01)
  *H04J 3/16* (2006.01)
  *H04W 28/10* (2009.01)
  *H04W 88/16* (2009.01)

(52) U.S. Cl.
  CPC ........... *H04W 76/10* (2018.02); *H04W 76/30* (2018.02); *H04W 88/16* (2013.01)

(56) References Cited

U.S. PATENT DOCUMENTS

| | | |
|---|---|---|
| 2018/0095787 A1 | 4/2018 | Oechsner |
| 2019/0254079 A1 | 8/2019 | Akoum et al. |
| 2019/0379446 A1 | 12/2019 | Rothaar et al. |
| 2020/0029265 A1* | 1/2020 | Choquette ......... H04W 36/0011 |
| 2021/0307005 A1 | 9/2021 | Raghavan et al. |

* cited by examiner

BEAM SWITCHING USER DATA OUTAGE REDUCTION IN A SPOT BEAM SATELLITE SYSTEM

CROSS-REFERENCE TO RELATED APPLICATIONS AND INCORPORATION BY REFERENCE

The present application is a continuation of U.S. patent application Ser. No. 17/133,761, filed Dec. 24, 2020, which is incorporated herein by reference in its entirety.

FIELD

A system and method for reducing outage times to user data traffic for satellite terminals when beam switching in a satellite spot beam network.

BACKGROUND

In the Prior art, when a satellite UT switches beams in a spot beam network, the UT pauses all user data traffic in each direction before switching into the new beam. The UT communicates a series of messages with a gateway in the network. After switching into the new beam, the UT establishes a successful receive and transmission RF link, and only once that is completed, the UT communicates to the central gateway over the satellite link that user data traffic can be resumed. The setup of the new transmission link and subsequent message exchange with the gateway takes several round trips over the satellite link which adds to the overall user data outage time.

Moreover, when switching to a new beam the UT transmits a burst into a wide aperture at the gateway so that the gateway can locate the terminal's current transmit timing offset and can send a message correcting the UT's transmit timing. After receiving the transit timing message, the UT can then use smaller, more efficient, apertures at the gateway. However, the wide aperture aloha message and the subsequent timing feedback message introduce a round trip message transmission time of approximately 0.5 seconds to the beam switch time.

Also, the gateway in the new beam does not send out bandwidth assignments for the terminal until it receives a message from the terminal informing the bandwidth allocator at the gateway that the terminal is present in the beam. This further exacerbates the outage time.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

By reducing the user data traffic outage times significantly upon a beam switch the present teachings provide significantly better quality of service to users of the mobile terminal. For users of UDP traffic, for example, voice over IP, media applications or the like, in which loss of data can cause noticeable artifacts to video and audio streams, the significant reduction in outage times minimizes interruptions to video and audio playback. For users of TCP traffic, the reduction in user data outage times reduces delays to user data traffic, improving user experience for activities such as web browsing, messaging, email retrieval, file transfers, or the like.

A system of one or more computers can be configured to perform particular operations or actions by virtue of having software, firmware, hardware, or a combination of them installed on the system that in operation causes or cause the system to perform a method for beam switching by a UT. The method includes initiating a beam switch between an old beam and a new beam when the UT is disposed in an overlap area of the old beam and the new beam; duplicating over the new beam, at a Network Access Point (NAP), user traffic to the UT; and assigning a Time Division Multiplex Access (TDMA) allocation for the UT on the new beam, prior to an arrival of the UT on the new beam, where the user traffic traversing a satellite network remains uninterrupted during the beam switch and the NAP redirects user traffic for the UT via the old beam to the new beam.

In one aspect, a satellite network includes a User Terminal (UT) configured to perform a beam switch between an old beam and a new beam when the UT is disposed in an overlap area of the old beam and the new beam; a Network Access Point (NAP) to duplicate over the new beam user traffic to the UT; and a new gateway to manage the new beam and to assign a Time Division Multiplex Access (TDMA) allocation for the UT on the new beam, prior to an arrival of the UT on the new beam, where the user traffic traversing the satellite network remains uninterrupted during the beam switch and the NAP redirects user traffic for the UT via the old beam to the new beam.

In some embodiments, the method or satellite network may include one or more of the following. The method or satellite network may include establishing communications over the new beam, and releasing resources for the old beam after the arrival of the UT in the new beam. The method or satellite network where the initiating is commenced by a gateway. The method or satellite network where the initiating includes receiving a message from the UT requesting the beam switch. The method or satellite network where the user traffic includes Internet Protocol (IP) traffic including a flow, the flow is not disconnected due to the beam switch, and a protocol associated with the flow resolves the duplicating. The method or satellite network where a duration of the duplicating is less than 30 seconds. The method or satellite network where the UT is configured to lock onto only one of the old beam or the new beam concurrently. The method or satellite network where the UT includes is configured to lock onto the old beam and the new beam concurrently. The method or satellite network may include performing for the new beam one or more of a timing ranging, power control fine tuning, and link adaptation during time gaps in a transmission schedule of the old beam. The method or satellite network where the old beam includes an old gateway servicing the old beam and an old satellite generating the old beam, the new beam includes a new gateway servicing the new beam and a new satellite generating the new beam, the old beam differs from the new beam in one or more of the old gateway, the new gateway, the old satellite and the new satellite. The method or satellite network may include maintaining addressing and a protocol acceleration context after the beam switch is complete. Other technical features may be readily apparent to one skilled in the art from the following figures, descriptions, and claims.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
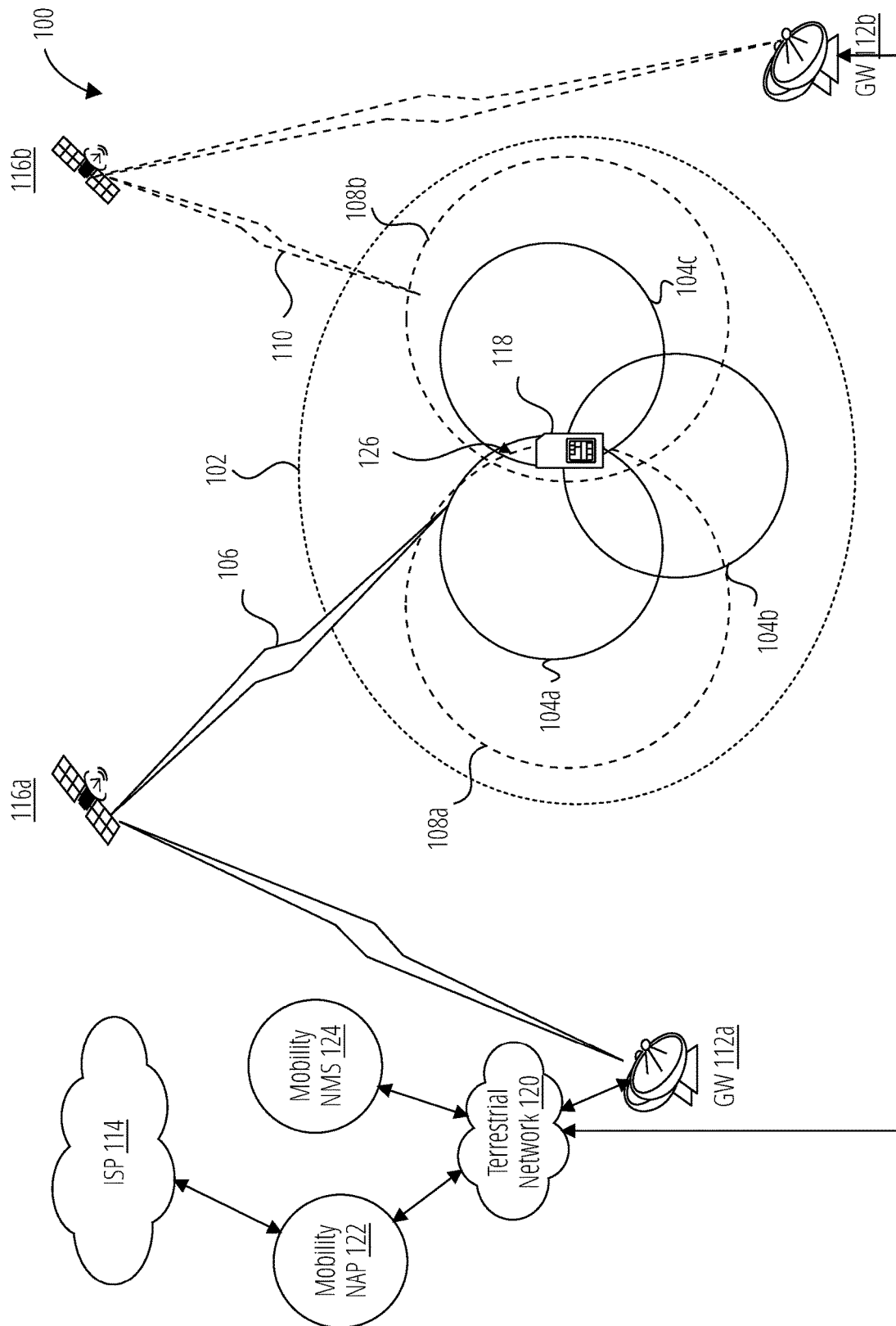
FIG. 1 illustrates an aspect of the subject matter in accordance with one embodiment.
Figure 2:
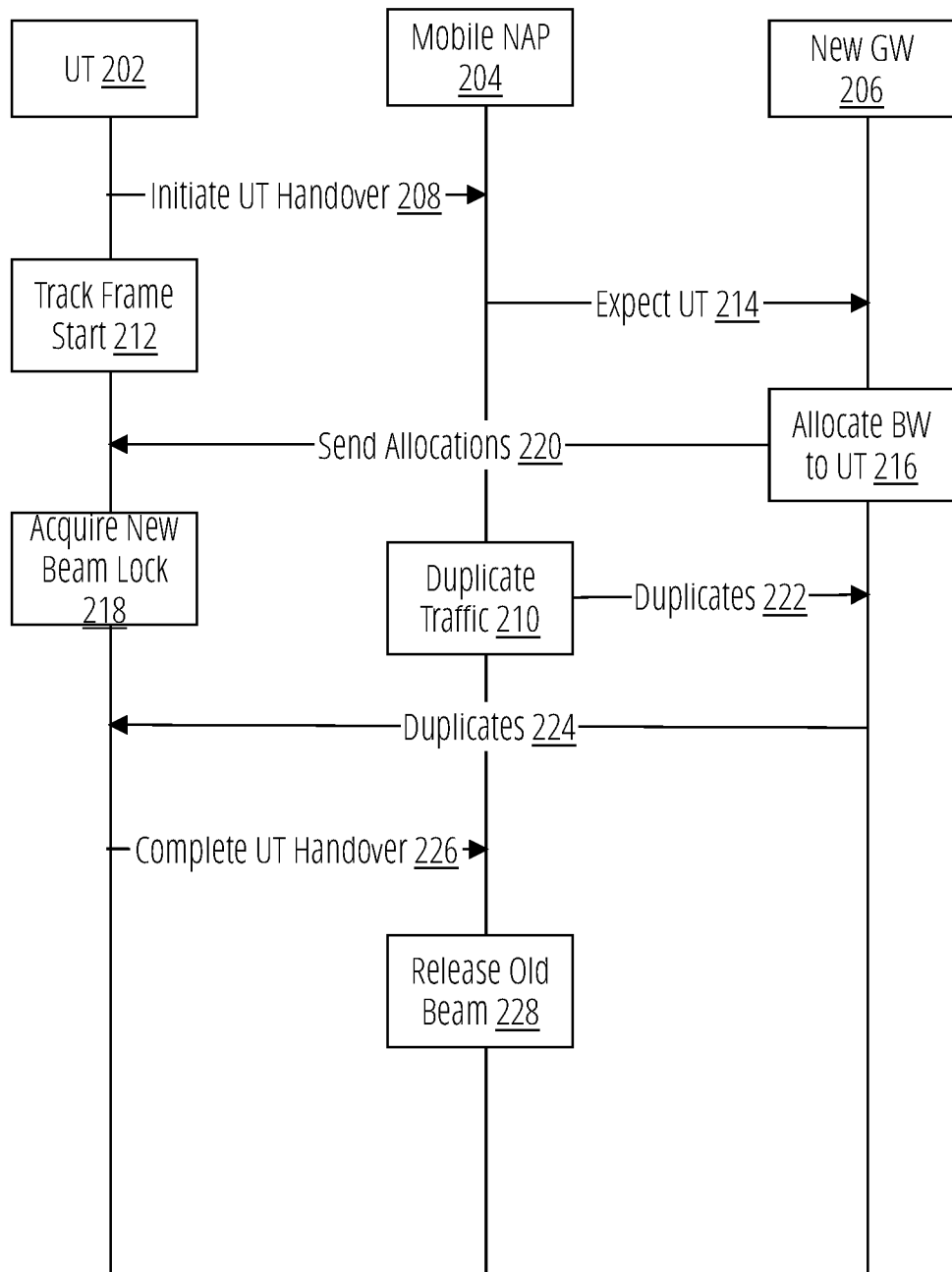
FIG. 2 illustrates an aspect of the subject matter in accordance with one embodiment.
Figure 3:
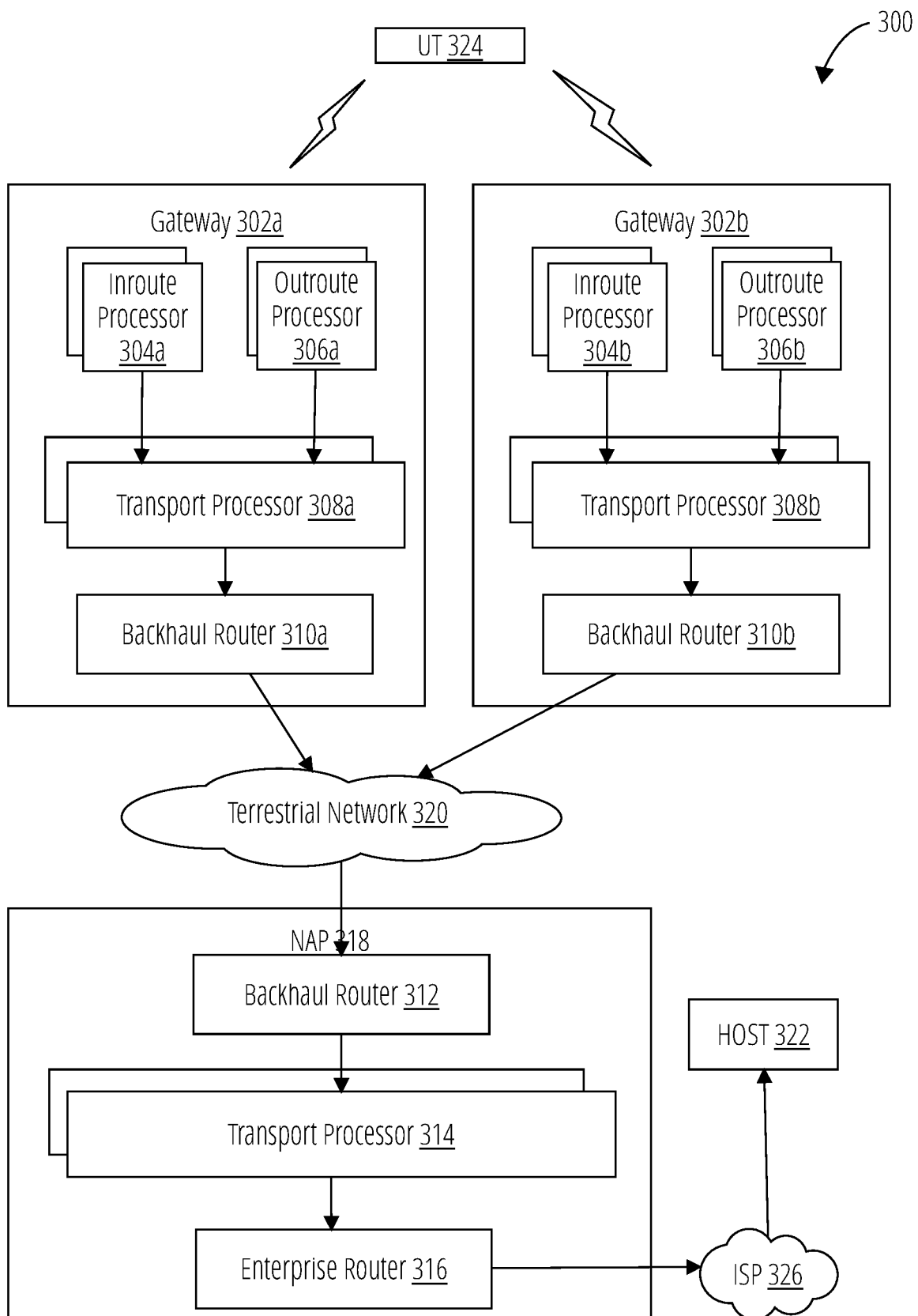
FIG. 3 illustrates an aspect of the subject matter in accordance with one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

Beam switching is used for satellite User Terminals (UTs) communicating through a satellite or High-Altitude Platform (HAP). The satellite may include a Low Earth Orbit (LEO), Medium Earth orbit (MEO) or Geosynchronous Earth Orbit (GEO) satellite. The beam switching may be used by a gateway (for example, to balance beam load), when a UT is within range of two beams of a one or more satellites. The movement may be due to a UT moving, for example, a UT on a plane in flight, a UT on a ship. The movement may be due to the movement of a HAP, LEO satellite or MEO satellite moving in an arc across the sky. As such, beam switching may be initiated in anticipation of the terminal moving beyond a range of the beam. The initiating may be commenced by the UT or ordered by a gateway. The UT maintains communication continuity by switching its communication path to a different beam in range.

The present teachings disclose a UT that immediately starts receiving user data traffic on the receive link once the UT has successfully locked to the receive RF carrier in the new beam. In one embodiment, a UT may inform a gateway of a new beam that the terminal to using next. When this happens, the gateway may start duplicating user data traffic on the receive RF carriers of both the old beam and the new beam. The duration of the user data outage in the receive direction of the UT may now be limited to the time it takes for the UT to acquire a receive lock in the new beam. As such, the time to notify the gateway of the new beam that the terminal is present and a resumption of the traffic to the UT can ensue is reduced or eliminated.

In some embodiments, the UT may reduce usage of standard aloha transmission techniques to establish transmit link timing in the new beam. In some embodiments, all gateways send a start of frame message to the UTs at exactly the same time by syncing to a reference clock, for example, the Global Positioning System (GPS) clock. As such, when the UT receives the start of frame message the UT can mark a pulse (or timestamp) for when it was received based on the position of the terminal's local oscillator. When the UT switches beams, the UT can take the delta from the pulse of marked timestamp to the last received frame message in the old beam. This delta is the difference in path delay in the new beam from the old beam, and the terminal can apply the delta to the timing information of the old beam to eliminate the outage associated with the aloha transmissions. In one embodiment, the UT may immediately perform small aperture bursts in the new beam without the need for the wide aperture round trip exchange used by the standard aloha techniques. The UT of the present teachings may include a modem, a Very Small Aperture Terminal (VSAT), a mobile device or the like.

In some embodiments, before the UT leaves the old beam, the UT informs the old gateway of the new beam. The old gateway may inform the new gateway that the terminal will arrive shortly. In some embodiments, the new gateway may immediately start assigning bandwidth for the terminal in the new beam, for example, at the most robust carrier rate available. As such, as soon as the terminal achieves carrier lock in the new beam the terminal may start sending user data traffic in the aperture of the already assigned bandwidth. The new beam may be served by the old gateway or a new gateway. The new beam may be served by an old satellite or a new satellite. The new beam may operate in a same or different RF band of the old beam.

The present teachings do not stop traffic before entering the new beam. Due to user data duplication in the new beam, the outage times now may be minimized for receive and transmit RF outages. As receive lock time is generally very minimal, a very small number of packets may be lost on the old beam while the UT is acquiring RX lock in the new beam. In some embodiments, end-to-end protocols such as, TCP and UDP, and applications may retransmit those small segments.

FIG. 1 illustrates an exemplary satellite network according to various embodiments.

The Satellite network 100 includes a coverage area 102, GWs 112a, a satellite s1 116a, a UT 118, a Terrestrial Network 120, a Mobility NAP 122, a Mobility NMS 124, and an ISP 114 (internet service point) connected to the Mobility NAP 122. The GWs 112a can service a s1 cell 104a, a s1 cell 104b, a s1 cell 104c with s1 beams 106. Different s1 beams 106 may be served by different GWs 112a. When the UT 118 is disposed in or imminently arriving in an overlap area 126 of two or more cells, for example s1 cell 104a and s1 cell 104b, a beam switch between respective beams of the service areas may be initiated. A beam switch between service areas of a common satellite may need a switch of gateways also.

The coverage area 102 may also be served a satellite s2 116b servicing a s2 cell 108a and a s2 cell 108b with s2 beams 110 using GWs 112b. GWs 112a and GWs 112b may be connected via the Terrestrial Network 120. The overlap area 126 may be between a s1 cell and an s2 cell, for example, s1 cell 104a and s2 cell 108b. In such an overlap area, the beam switch may switch satellites that needs a switch of gateways also.

The Satellite network 100 includes a Mobility NAP 122 that may serve as a NAP (Network Access Point) location for all network traffic. The GWs 112a and GWs 112b may provide UTs 118 with internet access via the ISP 114 connected to the Mobility NAP 122.

When a UT 118 goes to perform a beam switch, initially, user data follows the exact same path as it did before. Transmissions from UT 118 arrive at the GW 112a and are forwarded along the Terrestrial Network 120 to the Mobility NAP 122. Moreover, when a beam switch occurs, before entering the new beam, the UT 118 sends an indication to the Mobility NAP 122 about the beam handover and indicates a new beam. This triggers the Mobility NAP 122 to start duplicating user data traffic in the old/current beam as well as the new beam.

In some embodiments, the Mobility NAP 122 may notify the old gateway of the arrival of the UT 118 on the new beam. The old gateway may release any resources dedicated to servicing the UT 118 in response to the notification.

Setup

For user data duplication, prior to a beam switch, a UT 202 may initiate a beam switch by sending a control message (Initiate UT Handover 208) to the Mobile NAP 204 to indicate it is switching beams. The Initiate UT Handover 208 message may indicate which beam the UT 202 will be switching to. In one embodiment, a Mobile NAP 204, for example, at a central gateway location, may handle the Initiate UT Handover 208 message from the UT 202. The Initiate UT Handover 208 message may indicate which beam the UT 202 is switching to. In some embodiments, instead of stopping user data traffic, the Mobile NAP 204 duplicates the user data traffic destined for the UT 202 in the old beam and the new beam at operation Duplicate Traffic 210. Operation Duplicate Traffic 210 may send the duplicated user traffic to the 206 for transmissions over the new beam.

For quicker transmission throughput during a beam switch, the UT 202 may track a timestamp (local oscillator pulse) of the last received frame boundary control message sent by the gateway at operation Track Frame Start 212. Upon entering the new beam, the UT 202 may take the difference in timestamps of the first received frame boundary control message. This difference may be the difference in propagation delay between the two beams, and the UT 202 may use this along with timing parameters used for communicating with the old beam to synchronize its timing in the new beam without requiring a round trip transmission to the gateway.

The Mobile NAP 204 may send an Expect UT 214 message to the New GW 206 in the new beam requesting TDMA transmission allocations for the UT 202, so that when the UT 202 gets a receive lock in the new beam, the TDMA allocations are already arriving at the UT 202. In some embodiments, upon receiving the Expect UT 214 message from the Mobile NAP 204 the New GW 206 may assign TDMA allocations for the UT 202 and broadcast the allocations over the satellite link.

The Initiate UT Handover 208 message may be sent to the Mobile NAP 204, for example, by a UT 202 over the satellite link, by a load balancer via a terrestrial network, by a diversity controller via the terrestrial network or the like. In some embodiments, the Mobile NAP 204 may notify the UT 202 of a beam switch (for example, when someone other than the UT initiates the beam switch). This message may identity the old beam and the new beam. Properties of the new beam, such as, the RF frequency, orthogonality or the like of the new beam may be included in the message.

Pursuant to Initiate UT Handover 208 message the Mobile NAP 204 may send the Expect UT 214 message.

Flow Control

The old and new beams are likely to have different utilization and resources available. In some embodiments, the Mobile NAP 204 may duplicate user data on both beams at a lower of the old and new beam throughputs available. This may simplify management of packets that may potentially have to be retransmitted.

When the New GW 206 receives Expect UT 214 message, the New GW 206 may assign and broadcast TDMA transmission allocations in the new beam. Before the UT 202 starts locking to the new receive RF frequency in the new beam, the UT 202 may store known timing information from the old beam including a timestamp of the last receive start of frame message sent by the old GW (not shown). In the satellite network, the start of frame message may be sent at the same pulse periodically, for example, every 360 milliseconds. This timestamp is measured by looking at the current position of a local oscillator running internally on the UT 202.

When the UT 202 locks to the RF receive frequency in the new beam, a first start of frame control message from the gateway in the new beam will be received sometime after acquiring receive lock. As the start of frame messages are sent at the exact same pulse in each gateway in the spot beam network, the UT 202 can take a timestamp of this received message from its local oscillator. When in the same beam (or there is no beam switch), the difference in received timestamp is almost negligible, as the local oscillator wraps around with the same periodicity as the start frame message from the gateway (for example, every 360 ms). As such, a difference in timestamp reception between the last message received in the old beam and the first message received in the new beam is the difference in path delay between the two beams for the UT.

Using all timing knowledge from the old beam including a Terminal Offset Time or a time between receipt of a SFNPN (start of frame control message) at a UT 202 and the transmit time for the start of transmission for frame N at this UT 202, the UT 202 can adjust the old beam Terminal Offset Time by the different in path delay measured. In some embodiments, by using an exact measurement of the difference in path delay instead of using estimated values for path delay, the UT 202 does not transmit a large aperture burst in the new beam to synchronize its timing to a center of an aperture. Once receive lock is established in the new beam, the pre-assignment and broadcast of TDMA allocations by the new beam gateway, the UT 202 may start transmitting on these allocations without having to do a full roundtrip over the satellite link to establish timing synchronization.

The satellite network 300 includes a Gateway 302a, a Gateway 302b, an Inroute Processor 304a, an Inroute Processor 304b, an Outroute Processor 306a, an Outroute Processor 306b, a Transport Processor 308a, a Transport Processor 308b, a Backhaul Router 310a, a Backhaul Router 310b, a Backhaul Router 312, a Transport Processor 314, an Enterprise Router 316, a NAP 318, a Terrestrial Network 320, a host 322, a UT 324, and an ISP 326.

In some embodiments, when a beam switch is performed for the UT 324, the old and new gateway after the beam switch may be the same. For example, assuming that the Gateway 302a handles the old and new beam, subcomponents of the Gateway 302a (for example, Inroute Processors 304a, Transport Processors 308a and Outroute Processors 306a) maintaining the satellite links may change. However, the user traffic and its associated protocol remain unaffected as the NAP 318 maintains the integrity of the flow/connection of the user traffic between the UT 324 and the host 322 via the ISP 326.

In some embodiments, when a beam switch is performed for the UT 324, the old and new gateway after the beam switch may not be the same. For example, assuming that the Gateway 302a handles the old and Gateway 302b handles the new beam, the NAP 318 now would handle user traffic for the UT 324 from Backhaul Router 310b rather than Backhaul Router 310a. This change only the satellite link transport. The user traffic and its associated protocol remain unaffected as the NAP 318 maintains the integrity of the flow/connection of the user traffic between the UT 324 and the host 322 via the ISP 326.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for beam switching by a User Terminal (UT), the method comprising:
    initiating a beam switch between an old beam and a new beam when the UT is disposed in an overlap area of the old beam and the new beam;
    duplicating, over the new beam, user traffic to the UT;
    assigning a Time Division Multiple Access (TDMA) allocation for the UT on the new beam, prior to an arrival of the UT on the new beam; and
    determining a transmit instant for the new beam based on the TDMA allocation and a difference in a path delay between the new beam and the old beam calculated as a difference in a reception timestamp of a last message received in the old beam and a first message received in the new beam.

2. The method of claim 1, further comprising:
    establishing communications over the new beam; and
    releasing resources for the old beam after the arrival of the UT in the new beam.

3. The method of claim 1, wherein the initiating is commenced by a gateway.

4. The method of claim 1, wherein the initiating comprises receiving a message from the UT requesting the beam switch.

5. The method of claim 1, wherein the user traffic comprises Internet Protocol (IP) traffic comprising a flow, the flow is not disconnected due to the beam switch, and a protocol associated with the flow resolves the duplicating.

6. The method of claim 5, further comprising maintaining addressing and a protocol acceleration context after the beam switch is complete.

7. The method of claim 1, wherein a duration of the duplicating is less than 30 seconds.

8. The method of claim 1, wherein the UT is configured to concurrently lock onto one of the old beam or the new beam.

9. The method of claim 1, wherein the UT is configured to lock onto the old beam and the new beam concurrently.

10. The method of claim 1, further comprising during time gaps in a transmission schedule of the old beam, performing for the new beam one or more of a timing ranging, power control fine tuning, and link adaptation.

11. The method of claim 1, wherein the old beam comprises an old gateway servicing the old beam and an old satellite generating the old beam,
    the new beam comprises a new gateway servicing the new beam and a new satellite generating the new beam, and
    the old beam differs from the new beam in one or more of the old gateway, the new gateway, the old satellite and the new satellite.

12. A satellite network comprising:
    a User Terminal (UT) configured to perform a beam switch between an old beam and a new beam when the UT is disposed in an overlap area of the old beam and the new beam;
    a Network Access Point (NAP) to duplicate, over the new beam, user traffic to the UT;
    and
    a new gateway to manage the new beam and to assign a Time Division Multiple Access (TDMA) allocation for the UT on the new beam, prior to an arrival of the UT on the new beam,
    wherein the UE determines a transmit instant for the new beam based on the TDMA allocation and a difference in a path delay between the new beam and the old beam calculated as a difference in a reception timestamp of a last message received in the old beam and a first message received in the new beam.

13. The satellite network of claim 12, wherein the UT establishes communications over the new beam; and the NAP releases resources for the old beam after the arrival of the UT in the new beam.

14. The satellite network of claim 12, wherein the UT is instructed by a gateway to initiate the beam switch.

15. The satellite network of claim 12, wherein the NAP receives a message from the UT requesting the beam switch.

16. The satellite network of claim 12, wherein the user traffic comprises Internet Protocol (IP) traffic comprising a flow, the flow is not disconnected due to the beam switch, and a protocol associated with the flow resolves the duplicating by the NAP.

17. The satellite network of claim 16, further comprising maintaining addressing and a protocol acceleration context after the beam switch is complete.

18. The satellite network of claim 12, wherein the UT is configured to concurrently lock onto one of the old beam or the new beam.

19. The satellite network of claim 12, wherein during time gaps in a transmission schedule of the old beam, the UT performs for the new beam one or more of a timing ranging, power control fine tuning, and link adaptation.

20. The satellite network of claim 12, further comprising:
    an old gateway servicing the old beam;
    an old satellite generating the old beam; and
    a new satellite generating the new beam,
    wherein the old beam differs from the new beam in one or more of the old gateway, the new gateway, the old satellite and the new satellite.

* * * * *